Dec. 24, 1968    A. MENTNECH    3,417,782
VALVE CONTROL

Filed July 11, 1966      2 Sheets-Sheet 1

INVENTOR.
ADELBERT MENTNECH
BY
Nolte & Nolte
ATTORNEYS

Dec. 24, 1968  A. MENTNECH  3,417,782
VALVE CONTROL
Filed July 11, 1966  2 Sheets-Sheet 2

INVENTOR.
ADELBERT MENTNECH
BY
Nolte & Nolte
ATTORNEYS

United States Patent Office 3,417,782
Patented Dec. 24, 1968

3,417,782
VALVE CONTROL
Adelbert Mentnech, Locust Valley, N.Y., assignor of thirty-three and one-third percent to Albert C. Nolte, Jr., New York, N.Y.
Filed July 11, 1966, Ser. No. 564,111
5 Claims. (Cl. 137—624.11)

ABSTRACT OF THE DISCLOSURE

Solenoid operated valve device interposed between household faucets and connecting hoses of a household appliance, for instance a washing machine, the control for the solenoid valves of the device being arranged to operate the solenoid valves in synchronism with the inlet valves of the appliance thus releasing the appliance valves and the hoses of liquid pressure when the faucets are open and the appliance valves closed.

---

The present invention relates to household appliances.

In particular, the present invention relates to structure for controlling the flow of liquid to a household appliance.

At the present time household appliances, such as washing machines, are connected by hoses to faucets from which water is delivered to the appliance when the faucets are opened. When these faucets are opened, the hoses carry water at full pressure, and this pressure acts on valves of the appliance itself, such as a clothes washing machine, so as to maintain these valves under considerable stress during those periods of time when the valves are maintained closed by the timer of the appliance.

It is a primary object of the present invention to provide a structure which will relieve the appliance valves of the pressure which otherwise would act thereon when these valves are closed while the hoses of the appliance are connected with open faucets.

In particular, it is an object of the present invention to provide a unit which can be very conveniently interposed between the hoses of the appliance and the faucets and connected in an exceedingly simple manner with the electrical structure of the machine so as to automatically control the flow of liquid through the hoses while maintaining the pressure of the liquid displaced away from the appliance much closer to the faucets themselves when the timer does not actuate any of the appliance structure for delivering water thereto.

Thus, in accordance with the invention a solenoid valve means is provided, this means having suitable fittings for connecting it to a household faucet and to a hose of the appliance. An electrical means interconnects this solenoid valve means with the timer of the appliance, so that the flow of liquid to the appliance is controlled by the solenoid valve means of the invention, thus insulating the appliance itself from the pressure which otherwise would act on a valve of the appliance at those times when the timer of the appliance maintains the appliance valves closed, during use of the machine when the faucets are open.

The invention is illustrated by way of example in the accompanying drawings, which form part of this application and in which.

Figure 1:
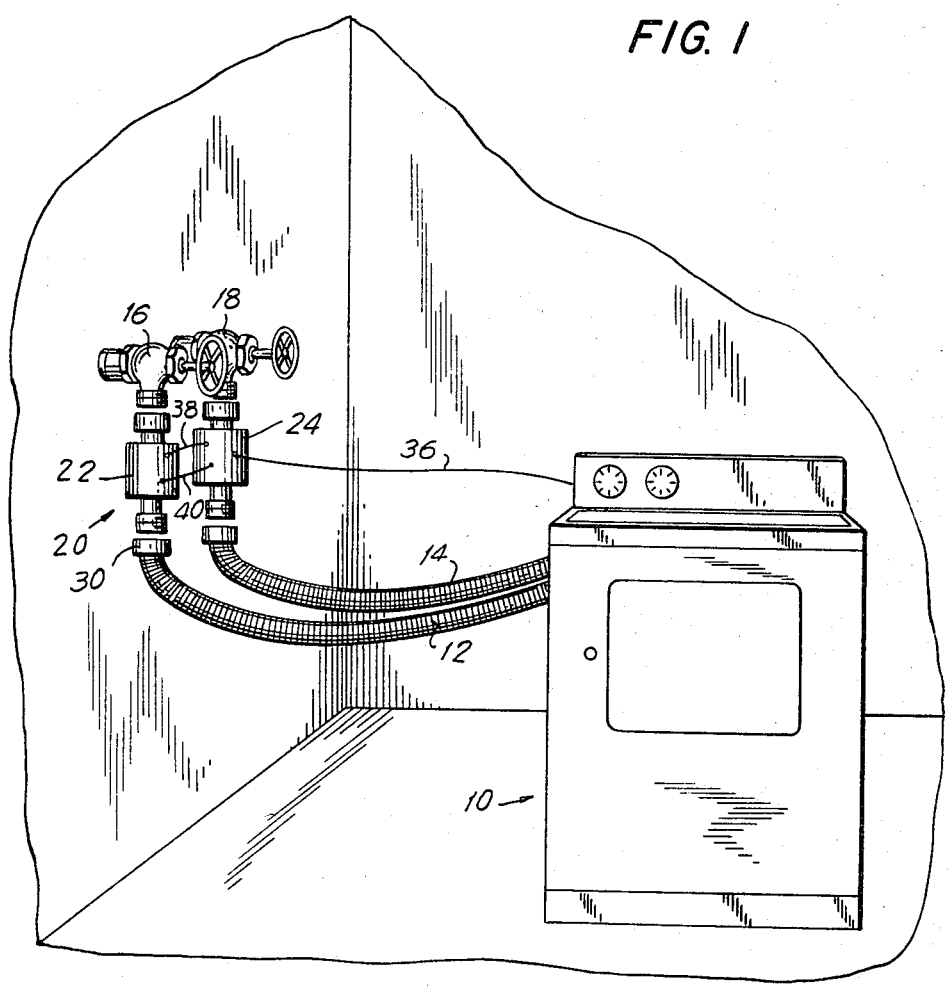
FIG. 1 is a schematic perspective illustration of one possible embodiment of an arrangement according to the present invention.

Referring to FIG. 1, there is shown therein an appliance 10 which may be a conventional clothes washing machine, for example, although other appliances such as dish washing machines and the like are not excluded. Such an appliance normally has a pair of hoses 12 and 14 through which, for example, hot and cold water are delivered to the appliance in response to the actuation of appliance valves through a timer of the appliance. These hoses 12 and 14 would normally be connected to the hot water faucet 16 and the cold water faucet 18, respectively, shown in FIG. 1 projecting from a suitable wall of a room in which the structure is situated.

Under these conditions the operator opens the faucets when it is desired to use the machine, thus immediately placing the valves of the machine under pressure. These valves are controlled automatically by a timer of the machine, and in accordance with the predetermined cycling of the machine by the timer, so as to carry out various washing cycles, rinsing cycles, drying cycles, and the like, the valves of the machine are automatically opened and closed, thus controlling the flow of water into the machine. As a result, at those times when the machine valves are closed, the hoses 12 and 14 are under full water pressure and this pressure also acts on the closed valves, subjecting them to considerable stress.

In accordance with the present invention, a unit 20 is interposed between the hoses and the faucets. This unit 20 includes a solenoid valve 22 adapted to be connected to the hot water faucet 16 and the hot water hose 12 as well as a solenoid valve 24 adapted to be connected to the cold water faucet 18 and the cold water hose 14.

Figure 2:
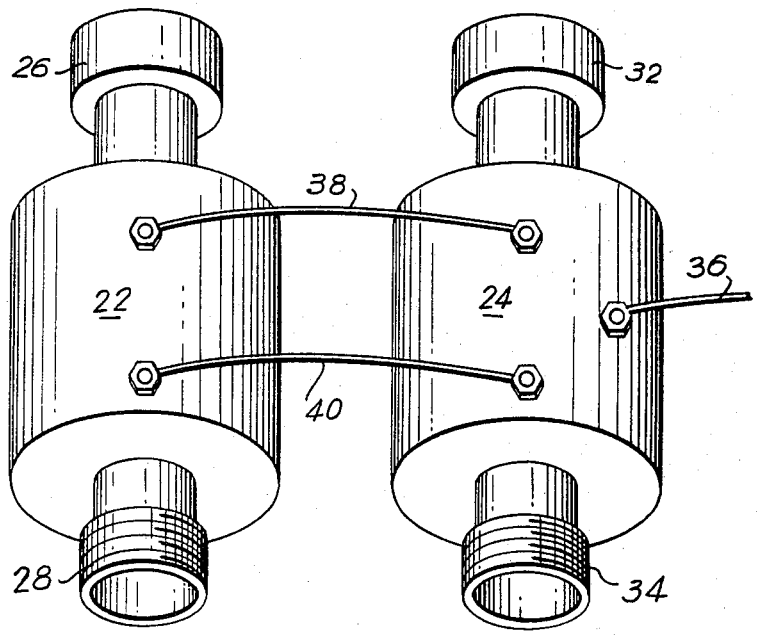
FIG. 2 is an enlarged elevation of the unit of the invention.

As may be seen from FIG. 2, the solenoid valve 22 has at one of its ends a fitting 26 in the form of an internally threaded sleeve adapted to be threaded onto the faucet 16 and at its opposite end a fitting 28 adapted to be received in the threaded sleeve 30 (FIG. 1) which is at the end of the hot water hose 12. In the same way, the solenoid valve 24 has at one end a fitting 32 for connecting it to the faucet 18 and at its opposite end a fitting 34 for connecting it to the hose 14.

In addition, an electrical means is provided for connecting the unit 20 to the timer of the appliance. This is an exceedingly simple electrical connection which can be provided by any maintenance man. Thus, the electrical means includes the cable 36 extending from the unit 20 to the machine, shown in the illustrated example as extending from the valve 24 to the machine, while the two valves 22 and 24 are interconnected by additional electrically conductive cable assemblies 38 and 40.

Figure 3:
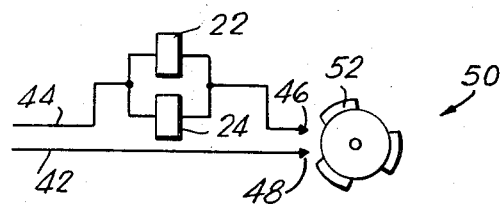
FIG. 3 is a wiring diagram.

The electrical arrangement will conform, for example, to that shown in FIG. 3 where the lines 42 and 44, which are connected to the power coming into the house, provide with the spaced contacts 46 and 48 a circuit which includes the solenoid valve 22 and the solenoid valve 24. The timer 50 is diagrammatically indicated in FIG. 3. This timer is rotated at a predetermined speed by a suitable mechanism of the appliance, as is well known, and the timer displaces insulated electrical conductors 52 of predetermined lengths along paths where they will bridge the space between and slidably engage the contacts 46 and 48, so that during predetermined periods of time the solenoids 22 and 24 are energized to open their valves. Thus, in this way the valves 22 and 24 are controlled in exactly the same way as valves of the appliance itself and consequently open and close in synchronism with the valves of the appliance, but with the structure of the invention the opening and closing of the valves controlling the flow of water from the open faucets will take place upstream of the hoses.

Therefore, with the structure of the invention not only are the machine valves themselves protected from the stresses resulting from the pressure of the water, but in addition the hoses 12 and 14 are also protected, since the hoses also will not be subjected to water pressure during those periods of time when the faucets are open but the appliance valves are closed. In this way the life of the hoses as well as the life of the machine valves are considerably increased.

What is claimed is:

1. A valve device, for controlling the flow of liquid, and interposed between a household faucet and a connecting hose of a household appliance having an inlet valve controlled by a timer of said appliance, comprising solenoid valve means having an inlet and an outlet opening, a pair of fittings, one of said pair connecting said inlet opening to a household faucet, the other of said pair connecting said outlet opening to said connecting hose of the household appliance, and electrical means connecting said solenoid valve means operatively to said timer whereby the solenoid valve means will selectively open and close in synchronism with the inlet valve of the appliance, thus relieving the inlet valve of liquid pressure to which it otherwise would be subjected while said faucet is open.

2. The combination of claim 1 and wherein an additional solenoid means has at its opposite ends a pair of fittings for connecting said additional solenoid means to another faucet and to another hose, respectively, leading to the appliance, so that the two solenoid means can be respectively connected operatively with faucets for hot and cold water, and said electrical means connecting said additional solenoid means also to the timer to be controlled thereby.

3. The combination of claim 2 and wherein said electrical means interconnects the two solenoid means with each other.

4. Apparatus for controlling the flow of water from a pair of faucets to an appliance having inlet valves controlled by a timer, comprising a pair of hoses communicating with the appliance and extending away from the latter, a pair of solenoid valve means operatively connected with said hoses, respectively, at ends of said hoses which are distant from the appliance, to control the flow of water thereto, a pair of fittings respectively connected to said pair of solenoid valve means for respectively connecting them with said faucets, and electrical means connecting said pair of solenoid valve means operatively to a timer of the appliance for controlling the opening and closing of the solenoid valve means in synchronism with the opening and closing of an inlet valve of the appliance.

5. The combination of claim 4 and wherein the pair of solenoid valve means respectively have a pair of additional fittings for detachably connecting them with the hoses, respectively.

References Cited

UNITED STATES PATENTS 2,877,467   3/1959   Cloud _____ 137—387 X

ALAN COHAN, *Primary Examiner.*

U.S. Cl. X.R.

68—207; 134—58; 137—607, 614.11